(12) United States Patent
Kiener et al.

(10) Patent No.: US 10,550,701 B2
(45) Date of Patent: Feb. 4, 2020

(54) BLADE FOR A TURBO ENGINE

(71) Applicant: Siemens Aktiengesellschaft, Munich (DE)

(72) Inventors: Christoph Kiener, Munich (DE); Yves Küsters, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 102 days.

(21) Appl. No.: 15/743,768

(22) PCT Filed: Jun. 30, 2016

(86) PCT No.: PCT/EP2016/065243
§ 371 (c)(1),
(2) Date: Jan. 11, 2018

(87) PCT Pub. No.: WO2017/009051
PCT Pub. Date: Jan. 19, 2017

(65) Prior Publication Data
US 2018/0202296 A1    Jul. 19, 2018

(30) Foreign Application Priority Data

Jul. 13, 2015  (DE) .................. 10 2015 213 090

(51) Int. Cl.
*F01D 5/18* (2006.01)

(52) U.S. Cl.
CPC ........ *F01D 5/187* (2013.01); *F05D 2260/201* (2013.01); *F05D 2260/202* (2013.01); *F05D 2260/204* (2013.01)

(58) Field of Classification Search
None
See application file for complete search history.

(56) References Cited

U.S. PATENT DOCUMENTS 6,238,183 B1 * 5/2001 Williamson ............ F01D 5/189
    416/96 A
6,325,593 B1 * 12/2001 Darkins, Jr. ............ F01D 5/186
    415/115

(Continued)

FOREIGN PATENT DOCUMENTS

DE    102009033753 A1    1/2011    ............... F01D 5/18
DE    102009048665 A1    3/2011    ............... B22F 5/04

(Continued)

OTHER PUBLICATIONS

Japanese Office Action, Application No. 2018501242, 14 pages, dated Feb. 26, 2019.

(Continued)

*Primary Examiner* — Justin D Seabe
*Assistant Examiner* — Jason A Fountain
(74) *Attorney, Agent, or Firm* — Slayden Grubert Beard PLLC (57) ABSTRACT

The present disclosure relates to turbomachines. Teachings thereof may be embodied in a blade for a turbomachine, having an interior space which is surrounded by a wall structure which forms the surface of the blade. For example, a blade for a turbomachine may include: an interior space surrounded by a wall structure forming a surface of the blade; and openings in the wall structure. The openings may include a plurality of micro-channels each extending from the interior space to the surface. Each of the plurality of micro-channels forms a path may define a particular direction for flowing cooling gas. The plurality micro-channels may be distributed over an area region of the surface.

17 Claims, 4 Drawing Sheets

(56) References Cited

U.S. PATENT DOCUMENTS

| | | | |
|---|---|---|---|
| 6,439,846 B1* | 8/2002 | Anderson | F01D 5/187 |
| | | | 416/96 A |
| 6,769,866 B1 | 8/2004 | Kannefass et al. | 415/115 |
| 9,435,208 B2* | 9/2016 | Bunker | F01D 5/147 |
| 10,036,258 B2* | 7/2018 | Mongillo | F01D 5/187 |
| 2007/0020100 A1* | 1/2007 | Beeck | F01D 5/147 |
| | | | 416/193 A |
| 2007/0280832 A1* | 12/2007 | Liang | F01D 5/186 |
| | | | 416/97 R |
| 2008/0095622 A1 | 4/2008 | Naik | 416/97 R |
| 2008/0290215 A1 | 11/2008 | Udall et al. | 244/123.14 |
| 2011/0236178 A1 | 9/2011 | Devore et al. | 415/1 |
| 2011/0262695 A1 | 10/2011 | Lee et al. | 428/131 |
| 2013/0001837 A1 | 1/2013 | Göhler et al. | 264/497 |
| 2013/0272850 A1 | 10/2013 | Bunker | 415/116 |
| 2014/0302278 A1* | 10/2014 | Bunker | B05D 3/002 |
| | | | 428/137 |
| 2015/0068629 A1 | 3/2015 | Kottilingam et al. | 137/808 |
| 2015/0345298 A1 | 12/2015 | Mongillo et al. | 60/755 |
| 2016/0115086 A1 | 4/2016 | Tuertscher et al. | 264/29.1 |

FOREIGN PATENT DOCUMENTS

| | | | |
|---|---|---|---|
| EP | 1995411 A2 | 11/2008 | F01D 5/14 |
| EP | 2653655 A2 | 10/2013 | F01D 5/14 |
| JP | 08158802 A | 6/1996 | H01D 5/18 |
| JP | 2002539350 A | 11/2002 | C04B 41/87 |
| JP | 2008051107 A | 3/2008 | F01D 5/18 |
| JP | 2009503331 A | 1/2009 | F01D 5/18 |
| JP | 2012189053 A | 10/2012 | F01D 25/00 |
| WO | 2017/009051 A1 | 1/1917 | F01D 5/18 |
| WO | 2008/046386 A1 | 4/2008 | B22F 3/105 |
| WO | 2014/105108 A1 | 7/2014 | F01D 5/14 |
| WO | 2014/193565 A1 | 12/2014 | F01D 5/28 |

OTHER PUBLICATIONS

German Office Action, Application No. 102015213090.8, 9 pages, dated May 2, 2016.

International Search Report and Written Opinion, Application No. PCT/EP2016/065243, 10 pages, dated Aug. 26, 2016.

\* cited by examiner

FIG 8

BLADE FOR A TURBO ENGINE

CROSS-REFERENCE TO RELATED APPLICATIONS

This application is a U.S. National Stage Application of International Application No. PCT/EP2016/065243 filed Jun. 30, 2016, which designates the United States of America, and claims priority to DE Application No. 10 2015 213 090.8 filed Jul. 13, 2015, the contents of which are hereby incorporated by reference in their entirety.

TECHNICAL FIELD

The present disclosure relates to turbomachines. Teachings thereof may be embodied in a blade for a turbomachine, having an interior space which is surrounded by a wall structure which forms the surface of the blade.

BACKGROUND

Blades for turbomachines may be used in gas turbines and/or aircraft turbines. They may be used both as guide blades and as rotor blades. It is possible to produce a turbine blade having a three-dimensionally extending lattice which fills an interior space of the turbine blade. Said interior space is surrounded by a wall, wherein, in said wall, there may be provided holes which connect the interior space to a surface of the turbine blade. Such openings may for example be used for transporting cooling gas from the interior space of the blade to the surface thereof. In this way, film cooling of the blade with the cooling gas is possible.

By means of additive production methods, the interior space of the blade can be equipped with a support structure in the form of struts. These may be designed in accordance with the loading, such that maximum stiffening of the blade is realized with the least possible material outlay. A blade together with the supporting interior structure can be produced in one working step by virtue of the fact that both the walls of the blade and the supporting interior structures can be produced layer by layer using an additive manufacturing method, such as for example laser melting, utilizing a CAD model.

SUMMARY

The teachings of the present disclosure may include a blade for turbomachines, in particular for gas turbines or aircraft turbines, which ensures improved film cooling of the blade. The teachings may be embodied in a method for the additive production of such a blade.

For example, some embodiments may include a blade for a turbomachine, having an interior space (29) which is surrounded by a wall structure (28) which forms the surface (23) of the blade, wherein openings (24) are provided in the wall structure (28), which openings connect the surface (23) to the interior space (29). The openings (24) in the wall structure (28) are formed by means of a multiplicity of micro-channels (25), wherein the micro-channels (25) each individually extend from the interior space to the surface, the micro-channels (25) each form a path which predefines a particular direction for flowing cooling gas, and the micro-channels (25) are distributed over an area region (26a, 26b, 26c) of the surface (23).

In some embodiments, the micro-channels (25) each individually extend from the interior space (29) to the surface (23).

In some embodiments, the micro-channels (25) are, in relation to a normal n to the surface (23), oriented with variable angles of inclination φ, measured in the blade cross section, and/or with variable angles of inclination ϑ, measured in the longitudinal orientation of the blade.

In some embodiments, the micro-channels (25) have a smaller angle φ the larger the impingement angle β of a flow in the turbomachine onto the surface (23) of the blade.

In some embodiments, the wall thickness of the wall structure (28) is variable.

In some embodiments, the wall thickness of the wall structure (28) is thinner the larger the impingement angle β of a flow in the turbomachine onto the surface (23) of the blade.

In some embodiments, the spacing a of the openings (24) to adjacent openings (24) in the area region (26a, 26b, 26c) is variable.

In some embodiments, the spacing a is smaller the larger the impingement angle β of a flow in the turbomachine onto the surface (23) of the blade.

In some embodiments, in the interior space (29) of the blade, there is provided a support structure (33) which is mechanically connected to the wall structure (28) and which has a channel system (36) through which the micro-channels (25) adjoining the support structure (33) are accessible, wherein the channel system has a lower flow resistance than the micro-channels adjoining the support structure (33).

In some embodiments, the support structure (33) is formed by a three-dimensional lattice.

In some embodiments, the support structure (33) has, in its interior, a supply channel (17) for cooling gas, wherein the supply channel has a lower flow resistance than the support structure.

In some embodiments, the supply channel (17) is separated from the support structure (33) by a screen structure (32).

In some embodiments, screen openings (38) in the screen structure have a cross section which is at most as large as that of the micro-channels (25).

In some embodiments, the supply channel (17) is connected to an outlet opening (19) which leads to the surface (23) of the blade.

In some embodiments, the outlet opening (19) in the surface (23) of the blade is situated on a suction side of the blade or in the trailing edge of the blade.

In some embodiments, the supply channel (17) has an undulating or meandering contour in cross section.

In some embodiments, the total cross section of the screen openings (38) is at least as large as the total cross section of the micro-channels (25).

In some embodiments, the transitions from the support structure (33) into the wall structure (28) and/or into the screen structure (32) are of flowing form.

In some embodiments, the cross section of the supply channel (17) increases in a radially outward direction proceeding from a blade root.

In some embodiments, strut arrangements (31) are provided in the supply channel (17).

In some embodiments, a cyclone separator (20) for the cooling gas is integrated into the supply channel (17).

Some embodiments may include a method for the additive production of a component, characterized in that a component as claimed in one of the preceding claims is produced.

BRIEF DESCRIPTION OF THE DRAWINGS

Further details of the disclosure will be described below on the basis of the drawing. Identical or corresponding elements of the drawing are denoted in each case by the same reference designations, and will be discussed multiple times only where differences exist between the individual figures. In the drawing.

DETAILED DESCRIPTION

In some embodiments, the openings in the wall structure are formed by a multiplicity of micro-channels, and are distributed over an area region of the surface. In the context of this disclosure, micro-channels are to be understood to mean channels whose diameter amounts to <1 mm or whose cross-sectional area does not exceed 0.8 mm$^2$ if the channels do not have a circular cross section. The micro-channels may have a diameter of <0.1 mm, or a cross-sectional area of less than 0.08 mm$^2$.

By virtue of the fact that the openings in the wall structure are formed as micro-channels, it is possible to realize the required total cross section for all cooling gas lines, with a relatively large number of micro-channels. The relatively large multiplicity of micro-channels can be distributed over an area region, that is to say a region with a two-dimensional areal extent, wherein said area region may cover a partial region of the total blade surface or entire region of the blade surface around which flow passes. The micro-channels may be distributed in a regular pattern or else in an irregular manner over the area region. In some embodiments, the micro-channels are arranged in an array or a grid, wherein the grid cells defined by the grid may, as the smallest unit of the grid, be shaped in any desired manner.

For example, it is possible for the micro-channels to be arranged in a square or rectangular grid. The grid cells may however also be honeycomb-shaped. The grid cells may furthermore be rhomboid or kite-shaped. Here, it is also possible for the grid cells to vary in terms of their geometry over the area region. In some embodiments, kite shapes may be provided as tetragonal grid cells, which extend increasingly further from the leading edge of the turbine blade to the trailing edge of the turbine blade, such that the density of the micro-channels per unit area is greater at the leading edge than at the trailing edge. In this way, it is possible to vary the outflowing cooling gas quantity in different regions of the surface of the blade.

By means of a relatively large number of micro-channels in relation to blades with channels of conventional dimensions, it can be ensured that a closed cooling film is generated more reliably on the blade surface. It is also possible for a greater film cooling volume to be supplied per unit of time, such that the cooling power on the blade surface can be increased. In this way, more reliable operation of the turbine is possible. In this way, it is possible to realize higher operating temperatures of the turbine blades or, for an unchanged operating temperature, materials can be selected which are less temperature-resistant. Another possibility consists in dispensing with a thermal protection coating of the blade (also referred to as Thermal Barrier Coating, or TBC for short). If blades of equal temperature resistance and/or with a TBC are used, the service life thereof may increase. It is thus possible to increase the efficiency of a turbine, because said efficiency is improved with increasing operating temperatures. In some embodiments, turbine blades can be produced and operated more economically without the need here to accept a loss in efficiency.

In some embodiments, the micro-channels each individually extend from the interior space to the surface. This means that each of the micro-channels follows a defined route through the wall structure that separates the surface of the blade from the interior space. Over said path, the flowing cooling gas can have a particular, in particular rectilinear direction imparted to it, wherein the direction can be configured, in a manner dependent on the blade geometry, for optimum cooling power.

In some embodiments, there is a method for additive production, according to which the blades including the micro-channels can be generated in one working step, such that a reworking step for generating the micro-channels is not necessary. This method therefore makes it possible for even a blade with a very large number of cooling gas openings in the form of micro-channels to be produced with manageable outlay because, owing to the fact that the component is built up layer by layer, the geometry of a component produced in an additive process can be selected to be virtually as complex as desired, without the manufacturing outlay being increased as a result.

In some embodiments, the micro-channels are, in relation to a normal n to the surface, oriented with variable angles of inclination φ, measured in the blade cross section, and/or with variable angles of inclination ϑ, measured in the longitudinal direction of the blade. Whereas the normal n is defined perpendicular to the surface of the blade, the micro-channels may be oriented not exactly as an elongation of said normal but rather so as to have an angle of inclination, which is measured as an angle between the normal n and the exit direction of the micro-channel at the surface of the blade.

In the case of a variation of the angle of inclination φ measured in a cross-sectional plane of the blade, the micro-channels may have a smaller angle φ the larger the impingement angle β of a flow in the turbomachine onto the surface of the blade. The impingement angle β of the flow may amount to at most 90°. Then, the flow impinges on the blade perpendicularly, which is approximately the case at the leading edge of the blade. In this region, therefore, the thermal loading of the blade material is at its highest, because the particles entrained by the flow impinge in relatively large numbers on the blade surface. Furthermore, a breach of the cooling film is most likely in this region, because the kinetic energy of the particles is oriented perpendicular to the extent of the cooling film. These effects can be best counteracted if the micro-channels are likewise oriented perpendicular to the surface, that is to say the angle φ is equal to or close to 0. The kinetic energy of the cooling gas particles is then directed exactly counter to the kinetic energy of the flow particles, and thus generates an optimum resistance to a breach of the cooling film.

Different conditions prevail at the suction side and at the pressure side of the blade, where the flow passes along the surface of the blade. Here, an alignment of the micro-channels with a large angle φ may allow the cooling gas to emerge from the micro-channels in the direction of the flow on the blade. In this way, the cooling gas pressed onto the surface of the blade in a laminar manner by the flow, whereby a film of cooling gas is formed.

A variation of the inclination angle $\vartheta$ that can be measured in a longitudinal section through the blade permits film cooling even at those locations of the blade which are difficult to reach owing to the geometry of the blade. For example, owing to a minimum wall thickness of the blade wall, the interior space of the blade must maintain a certain spacing to the blade surface. At the radially outer blade edge, the micro-channels can still be reached by means of an angle $\vartheta$ open toward the blade edge, despite a spacing of the interior space from the radially outer edge, such that in this region separation of the cooling-gas film does not occur.

In some embodiments, the wall thickness of the wall structure is variable. With this measure, the cooling gas may emerge at the blade surface in different quantities per unit of area. Specifically, the thinner the wall structure is, the lower the flow resistance that it generates. Since the channels are micro-channels, the flow resistance increases quickly with increasing wall thickness of the wall structure. Therefore, this can be used as a design criterion to directly influence the emerging cooling gas quantity. Here, it is self-evidently necessary to adhere to the mechanically required minimum wall thicknesses determined by the mechanical loading of the blade.

For example, the wall thickness of the wall structure may be thinner the larger the impingement angle of a flow in the turbomachine onto the surface of the blade. As already described, the thermal loading of the blade is specifically greater in those regions in which the flow impinges on the surface with a relatively large impingement angle, such that, in this region, a wall structure with a correspondingly relatively thin wall thickness leads to a greater volume flow of cooling gas per micro-channel. A greater volume flow of cooling gas in this surface region of the blade furthermore has the effect that the film which forms is made more stable, and thus cannot be so easily displaced by the impinging flow.

In some embodiments, the spacing a of the openings to adjacent openings in the area region is variable. This, too, is a design measure influencing the discharged cooling gas quantity per unit of area of the surface of the turbine blade. The smaller the spacings a to adjacent micro-channels is, the greater is the available cooling gas quantity. As already described, this effect may be utilized for providing a greater cooling gas quantity in the region of the leading edge of the blade.

The design measures described above, with which the cooling gas quantity per unit of area of the blade surface can be influenced, may be combined with one another. In this way, in regions where the wall thickness of the wall structure can be reduced no further for structural reasons, a further increase in the discharged cooling gas quantity may result for example by means of an increase of the density of the micro-channels (that is to say by means of a reduction of the mutual spacing a).

In some embodiments, in the interior space of the blade, there is a support structure mechanically connected to the wall structure and which has a channel system through which the micro-channels adjoining the support structure are accessible. Here, it is ensured that the channel structure has a lower flow resistance than the micro-channels adjoining the support structure. The support structure may lead to mechanical stiffening of the blade. This has the effect that the wall structure can be designed with thinner walls. The thinner the walls of the wall structure can be, the greater, for the reasons stated above, is the maximum cooling gas quantity that can be supplied, which increases the cooling power. Here, it must however be ensured that the cooling gas quantity that can be supplied is not limited by the flow resistance of the support structure. Therefore, the channel system formed by the support structure must have an adequately low flow resistance.

By virtue of the blade being stiffened by means of the support structure in the interior, the blade can be produced with less material outlay. In this way, firstly, the total mass of the moving parts in the turbine is reduced, which has a positive effect on the mechanical demands on the turbine. For example, the bearing forces for the turbine rotor are reduced. Another positive aspect lies in the fact that the blade, owing to its relatively low mass, also has a relatively low thermal capacity. The blade can thus absorb less heat, and deforms less owing to the effective cooling. Finally, the deformations of the blade that arise owing to the creep effects are reduced owing to the relatively low mass of said blade, which increases the creep resistance of the blade and leads to longer service lives.

The support structure may be formed by a three-dimensional lattice. The lattice may be composed of struts which each converge at junctions. In this way, it is possible to generate a framework which has an increased stiffening effect in relation to its mass. In this way, it can also be ensured that the support structure has a low flow resistance, to ensure an adequate supply of cooling gas to the micro-channels.

In some embodiments, the support structure has, in its interior, a supply channel for cooling gas, wherein the supply channel has a lower flow resistance than the support structure. In this way, the cooling gas can be supplied via the supply channel equally to all regions of the support structure, such that a uniform supply of cooling gas to the micro-channels is ensured.

In some embodiments, the supply channel is separated from the support structure by a screen structure. The screen structure may retain particles from the cooling gas such that said particles do not pass via the support structure to the micro-channels. In this way, a risk of blockage of the micro-channels can be reduced. Blockage of the micro-channels may, in those surface regions of the blade where cooling gas channels are blocked, collapse the cooling-gas film and thermal damage to the blade could occur.

In some embodiments, the screen openings in the screen structure have a cross section which is at most as large as that of the micro-channels. In this way, it can be ensured that the screen structure in any case retains particles in the cooling gas which are large enough that they would also block the cooling channels. The risk of blockage of the screen structure itself is lower in relation to the micro-channels, because the cooling gas in the supply channel sweeps past the screen openings and only a small partial volume passes into the screen openings. A blockage of individual screen openings is also less detrimental than a blockage of micro-channels, because blocked screen openings are circumvented by the cooling gas, which can nevertheless distribute across all micro-channels in the support structure situated downstream of the screen structure.

In some embodiments, the total cross section of the screen openings is at least as large as the total cross section of the micro-channels. This has the effect that a volume flow of cooling gas through the screen openings is large enough that sufficient cooling gas can be supplied to the micro-channels. Here, it must be taken into consideration that the screen structure may have a smaller wall thickness than the wall structure of the blade, such that, furthermore, a pressure loss at the screen openings is smaller than at the micro-channels. Even if some of the screen openings are blocked, a volume flow of the cooling gas large enough that the micro-channels can be supplied with cooling gas is thus still maintained.

In some embodiments, the supply channel is connected to an outlet opening which leads to the surface of the blade. Said outlet opening allows particles that have passed into the supply channel to be transported out of the interior space of the blade through the outlet opening. The outlet opening may therefore has a larger cross section than the micro-channels, so even relatively large particles can be discharged from the interior space. The outlet opening may be situated in the surface of the blade on a suction side of the blade or in the downstream edge of the blade (trailing edge). This has the effect that the outlet opening is charged with a negative pressure at the blade surface, whereby a volume flow of the cooling gas out of the blade is ensured. The particles are thus sucked out, as it were.

In some embodiments, the supply channel has an undulating or meandering contour in cross section. In this way, the circumference of the respective cross section is large in relation to the cross-sectional area, such that a relatively large outer surface is available for the screen structure. In this way, a greater number of screen openings may be accommodated in the screen structure, which leads to the demand discussed above, of an adequately small pressure drop across the screen structure, being achieved.

The structures described above need not be discrete structures which have discrete transitions to one another. In some embodiments, transitions from the support structure into the wall structure and/or into the screen structure may also be of flowing form. In other words, there are no step changes in cross sections in the channel structures formed by said structures. The cooling gas flow can be transported in an undisrupted manner, and thus with a small pressure loss. Furthermore, the acting mechanical forces can be transmitted with less disruption between the support structure, the wall structure and the screen structure. This may improve the mechanical stability of the blade.

In some embodiments, the cross section of the supply channel increases in a radially outward direction proceeding from a blade root. This may improve a discharge of particles through the outlet opening, because the pressure of the cooling gas in the supply channel decreases in the radially outward direction, and thus assists the transport of particles.

In some embodiments, there are strut arrangements in the supply channel. Said strut arrangements may lead to a further stabilization of the blade, because the opposite walls of the supply channel are supported against one another. The strut arrangement in the supply channel may also be formed with a flowing transition to the screen structure or, in the absence of the screen structure, with a flowing transition to the support structure.

In some embodiments, there is a cyclone separator for the cooling gas integrated in the supply channel. This has the effect that the cooling gas is conducted through the cyclone separator, and already has some of the entrained particles removed from it, before said cooling gas passes through the screen structure. Said particles that are separated off in the cyclone separator may be discharged from the blade through a separate outlet channel.

Figure 1:
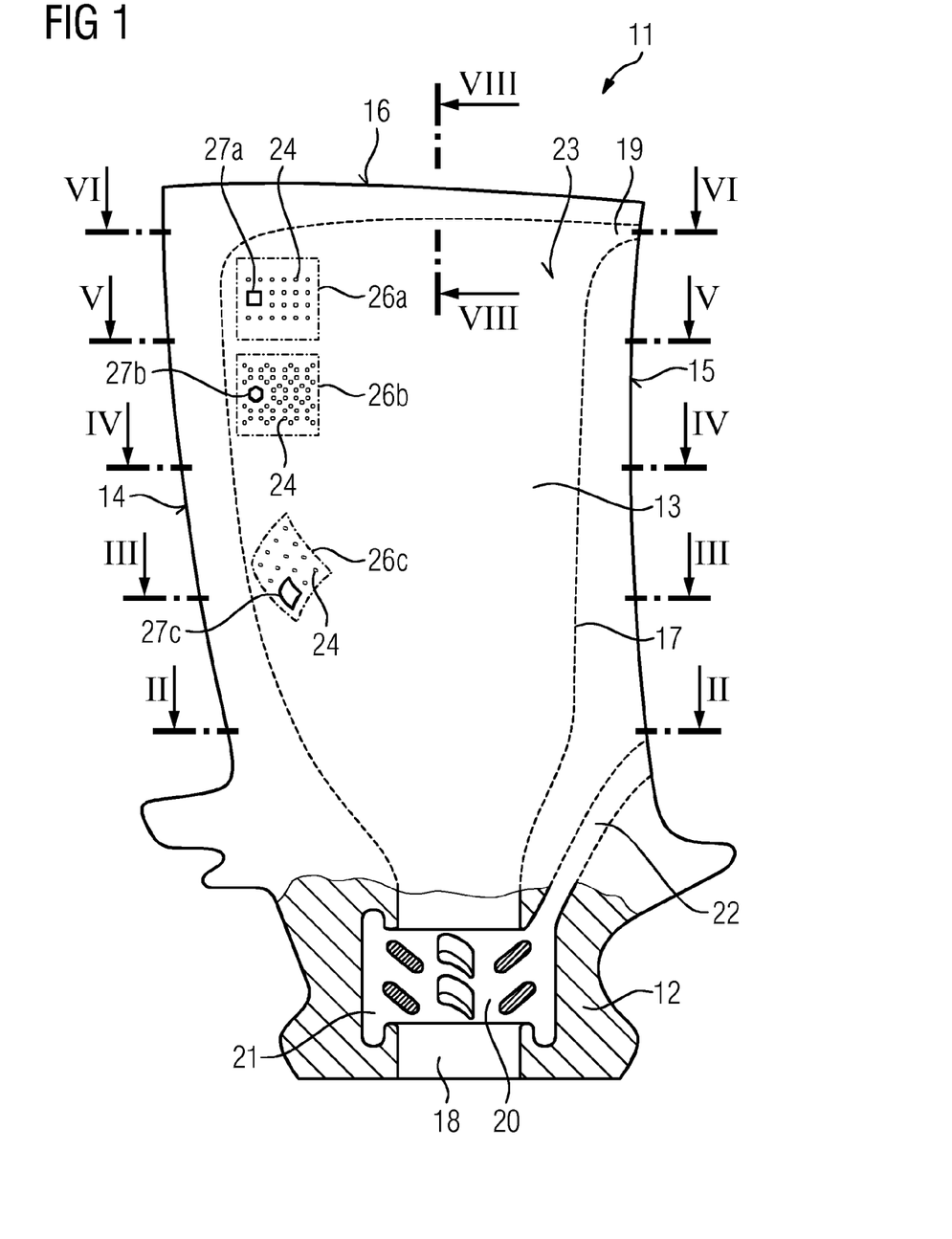
FIG. 1 shows an exemplary embodiment of the blade in a partially cut-away side view, according to teachings of the present disclosure.

As shown in FIG. 1, a blade 11 may include a blade root 12, by means of which said blade can be inserted into a rotor (not illustrated) of a turbine. A blade airfoil 13 extends radially outward from the blade root 12. The blade airfoil 13 has a leading edge 14 and a trailing edge 15, wherein the profile realized by the blade airfoil can be seen in FIGS. 2 to 6. The planes of the profiles illustrated in FIGS. 2 to 6 are shown in FIG. 1.

A supply channel 17 for a cooling gas extends from the blade root 12, to a radially outer edge 16 of the blade airfoil 13. Said supply channel is illustrated by dashed lines in the non-cut-away region of the blade 11. The supply channel 17 extends from an inlet opening 18 in the blade root to an outlet opening 19 close to the radially outer edge 16. The outlet opening 19 may be situated exactly in the trailing edge 15. In the inlet opening 18 of the supply channel 17, there is furthermore situated a cyclone separator 20, by means of which particles from the cooling gas are firstly transported into a ring-shaped chamber 21, which surrounds the supply channel 17, and then out of the blade 11 through an outlet channel 22.

FIG. 1 furthermore illustrates that openings 24 for cooling gas may be provided in a surface 23 of the blade 11. Said openings may be formed by micro-channels 25 (cf. FIG. 2), such that the cross section of the openings 24 amounts to less than 0.8 mm². FIG. 1 illustrates by way of example how the openings 24 may be distributed over area regions 26a, 26b, 26c. Said area regions define in each case a grid of the openings 24, which are arranged for example in a square grid in the area region 26a. A grid cell 27a is thus square, though could also be rectangular (not illustrated). In the area region 26b, the openings are arranged in a honeycomb shape. The grid cell 27 is therefore that of a regular hexagon. In the area region 26c, the openings lie on curved paths to yield kite-shaped grid cells 27c. By means of this measure, it is possible for the density of openings to be greater close to the leading edge 14 than at the trailing edge 15.

Figure 2:
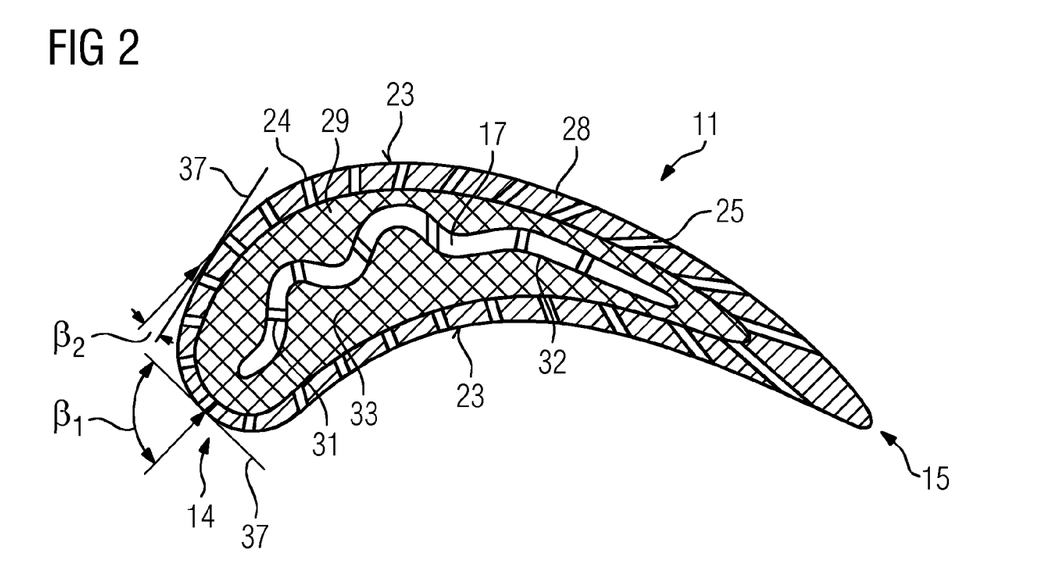
FIGS. 2 to 6 show different cross sections of the blade as per FIG. 1.

FIG. 2 shows the section II-II as per FIG. 1. The construction of the blade can be viewed particularly easily on the basis of the section. The surface 23 of the blade 11 is formed by a wall structure 28. Said wall structure has the micro-channels 25, which, for the sake of better clarity, are illustrated with an excessively large cross section (i.e., not to scale). Furthermore, the wall structure 28 encloses an interior space 29, in which the micro-channels 25 open out.

Figure 7:
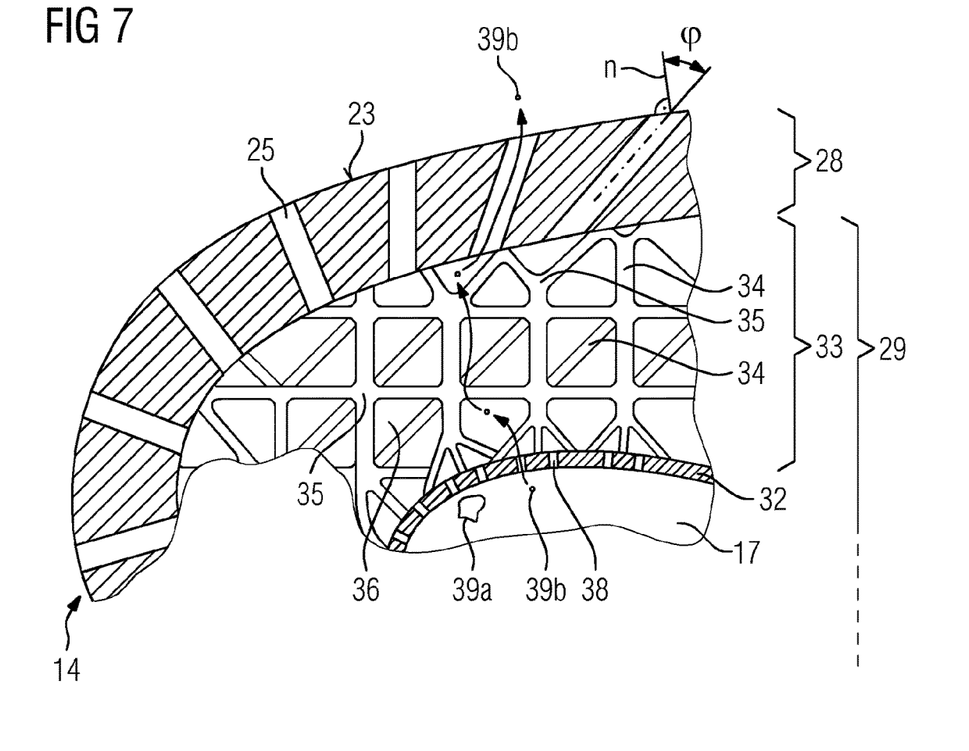
FIG. 7 shows, in detail, the construction of the blade as per FIG. 1, with wall structure, support structure and screen structure, in section.
Figure 8:
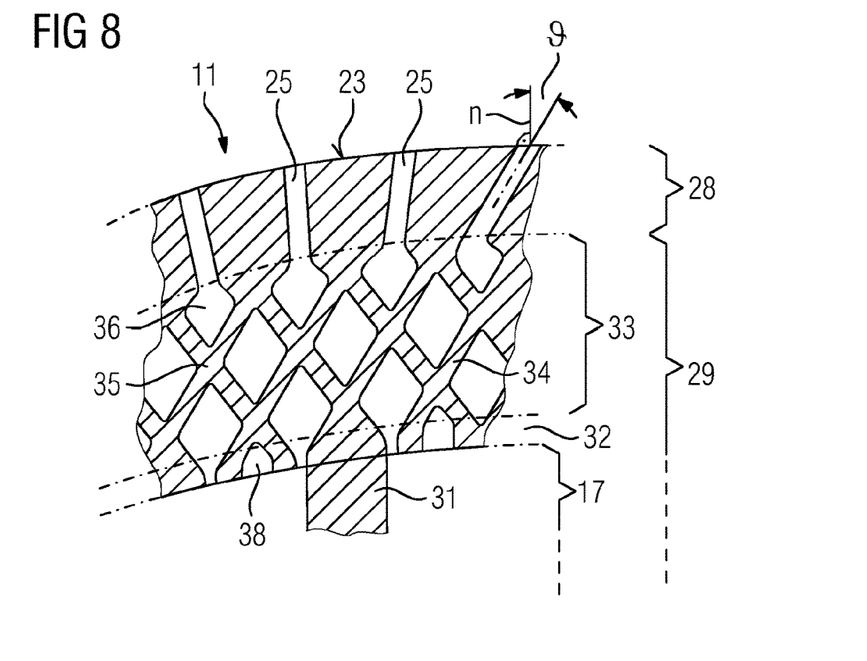
FIG. 8 shows a detail of another exemplary embodiment of the blade, with wall structure, support structure and screen structure, in a section, according to teachings of the present disclosure.

The interior space 29 is constructed as follows: the supply channel 17 is formed in the middle of the cross section defined by the interior space 29. Said supply channel is itself stabilized by strut arrangements 31, which bridge the supply channel 17 and which are flowed around by the cooling gas flowing perpendicular to the plane of the drawing. Said strut arrangements 31 pose only a low flow resistance to said flow. The supply channel is delimited by a screen structure 32, which will be described in more detail in terms of structure in FIG. 8. In FIG. 2, said screen structure is merely indicated by a solid line. The screen structure 32 and the wall structure 28 are connected to one another by means of a support structure 33, wherein the support structure 33 is indicated in FIG. 2 by crosshatching. As can be seen in FIGS. 7 and 8, the support structure 33 is composed of a framework which has struts 34 and junctions 35, which framework is open and therefore forms a channel system 36, wherein said channel system connects the screen structure 32 to the wall structure 28.

Figure 3:
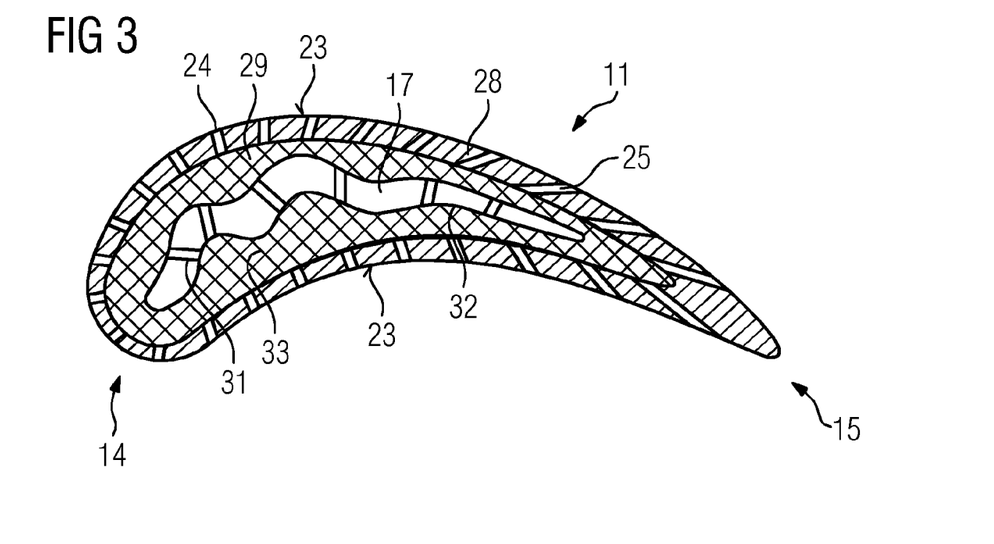
Figure 4:
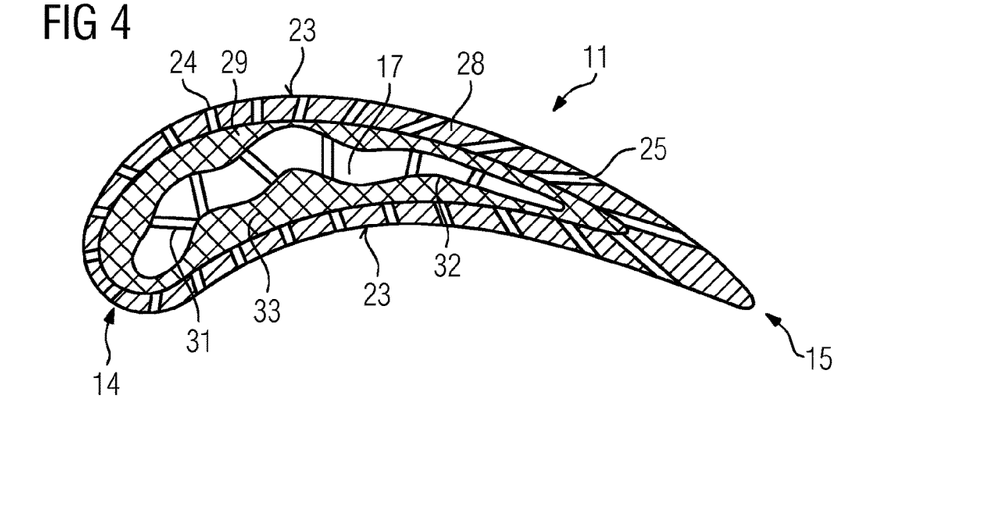
Figure 5:
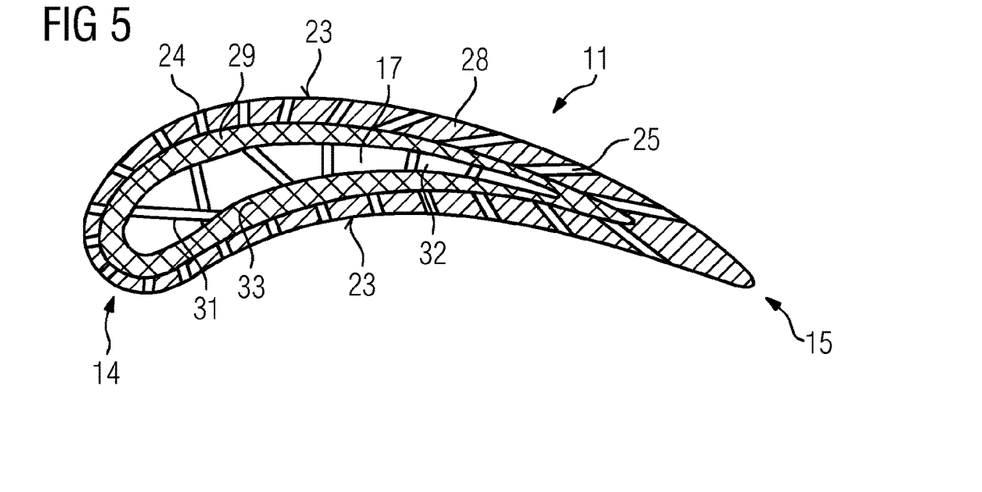
Figure 6:
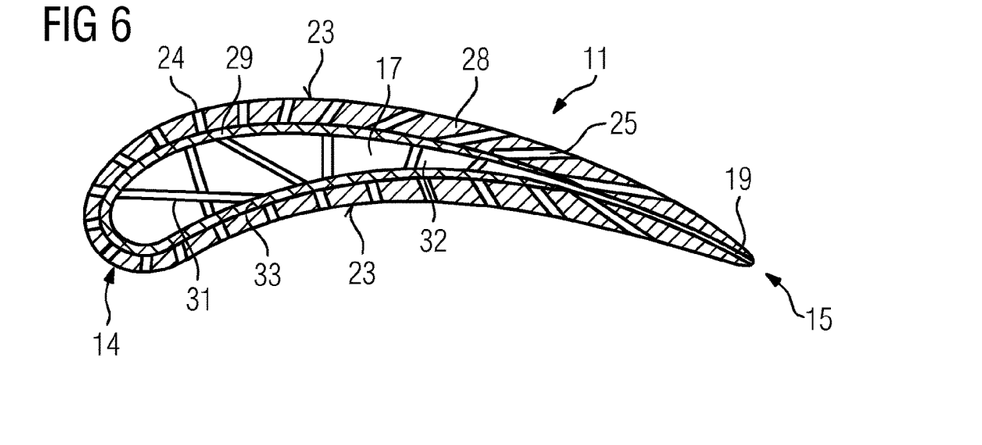

The cross sections III-III as per FIG. 3, IV-IV as per FIG. 4, V-V as per FIG. 5 and VI-VI as per FIG. 6 are, in terms of structure, constructed in the same way as the cross section as per FIG. 2. It is merely the case that, in FIG. 6, the outlet opening 19, into which the supply channel 17 opens out in order that particles can be transported out of the supply channel, can additionally be seen.

Otherwise, the cross sections as per FIGS. 2 to 6 differ in terms of their different topology, which are predefined by the geometry of the blade airfoil 13 as per FIG. 1. Whereas the blade cross section as per FIG. 2 is of compact form, the blade cross section as per FIG. 6 is of more stretched form. This is owing to the generally known and conventional blade geometry.

The geometry of the interior space 29 enclosed by the wall structure 28 inevitably changes with the blade cross section, because the thickness of the wall structure 28 is structurally predefined. The can be seen in all of FIGS. 2 to 6 that the wall thickness of the blade is thinner at the leading edge 14 than in the further profile of the wall structure of the blade. Firstly, here, the curvature of the wall structure is at its greatest, and is thereby additionally stabilized. In some embodiments, the flow resistance of the micro-channels 25 may be particularly low in said region. Since the flow resistance is directly dependent on the length of the micro-channels, thinner wall thicknesses of the wall structure 28 also lead to a lower flow resistance.

The lower flow resistance is useful because, as illustrated in FIG. 2, an impingement angle $\beta_1$ is almost perpendicular to a tangent 37 to the surface 23. A relatively large volume throughput of cooling gas thus protects the particularly vulnerable leading edge 14 of the blade against overheating. In the further profile of the blade, the angle at which the flow impinges on the surface 23 of the blade 11 becomes progressively smaller, as can be seen for example from $\beta_2$. At this point of the blade, the cooling gas lies as a film on the surface 23 more easily, for which reason less cooling gas is required. This is controlled because the micro-channels 25 are longer, and thus have a greater flow resistance, in this region of the wall structure.

The longer path of the micro-channels 25 at the latter point of the wall structure 28 however arises not only as a result of a greater thickness of the wall structure 28 but also by means of an angle of inclination φ (see FIG. 7) measured in relation to a normal n, which is perpendicular to the surface 23 of the blade 11. The angle of inclination φ has the effect that, in the case of relatively small impingement angles $\beta_2$, the flow of the cooling gas lies as a film on the surface 23 more effectively. By contrast, in the region of the leading edge 14, it is desirable for the cooling gas to be directed counter to the flow impinging on the blade, and to thereby slow the impinging flow. In this way, the temperature at the surface 23 is also lowered in said region. Viewing FIGS. 3 to 6, it becomes clear that this consideration is equally taken account of for an angle of inclination φ and a wall thickness of the wall structure, even though the angles are not shown in these figures.

It furthermore becomes clear that the supply channel 17 as per FIG. 2 has an elongate undulating or meandering cross section. In this region, therefore, the surface of the screen structure 32 is enlarged, such that the flow loss generated by the screen structure can be reduced. If one compares the cross sections of the supply channel in FIGS. 3 to 6, it can be seen that the meandering cross section of the supply channel becomes ever less pronounced. However, the cross-sectional area of the supply channel as a whole increases, whereby a greater area is also available for the screen structure.

The interaction of the wall structure 28, the support structure 33 and the screen structure 32 can be seen in greater detail in FIG. 7. These are three structures, the transition of which may be in each case discrete. The support structure 33 is anchored with its struts 34 directly on the wall surfaces of the screen structure 32 and of the wall structure 28. The screen structure 32 has screen openings 38, which connect the supply channel 17 in each case to the channel system 36 formed by the support structure 33. Via the channel system, the cooling gas then passes to the micro-channels 25 formed in the wall structure 28.

In FIG. 7, the screen openings 38 have a smaller cross section than the micro-channels 25. It is ensured in this way that particles 39a from the cooling gas are retained, because these do not pass through the screen openings 38. A particle 39a has a size in the case of which there would be the risk of a micro-channel 25 being blocked by the particle 39a. A relatively small particle 39b passes through the screen opening 38, as indicated in FIG. 7. It is however immediately clear that the particle 39b is so small that it can be transported without problems through the channel system 36 and the micro-channel 25 without blocking the latter.

FIG. 8 shows the section through a blade 11 of a different construction. The section VIII-VIII is indicated in FIG. 1 to illustrate the orientation thereof along the longitudinal extent of the blade airfoil, despite the fact that the blade 11 as per FIG. 9 is not the blade 11 as per FIG. 1.

From FIG. 8, it is possible to see the orientation of the angle ϑ, which deviates from the normal n to the surface 23 of the blade 11. In the section plane of FIG. 8, in the vicinity of the blade edge 16, the angle of inclination ϑ makes sense because the micro-channels 25 must likewise lead away from the channel structure 36 in said region, which channel structure, in the same way as the supply channel 17, however cannot extend all the way to the radially outer blade edge 16. To bring a cooling film as close as possible to the radially outer blade edge 16, it is therefore advantageous for the openings 24 of the micro-channels 25 to be brought as close as possible to said radially outer blade edge by means of an angle of inclination ϑ.

FIG. 8 furthermore shows a construction of the wall structure 28, of the support structure 33, of the screen structure 32 and of the supply channel 17 in the case of which step changes in cross section of the channel system formed by these structures are avoided. It can be seen how the screen openings 38 open into the channel structure 36 of the support structure 33 without step changes in cross section. A transition of said channel structure 36 into the micro-channels 25 also takes place with flowing cross-sectional transitions. This is likewise achieved for the strut arrangement 31, which extends into the supply channel 17 for the purposes of stabilizing the latter.

The struts 34 and junctions 35 of the support structure 33 are illustrated schematically in section in FIG. 8. Since the struts 34 are rod-like structures, a flow around said struts in front of and behind the plane of the drawing is readily possible. The impression given by FIG. 8 that the channel structure 36 is composed of individual cells that are not fluidically connected to one another is thus misleading. A connection between the screen openings 38 and the micro-channels 25 is thus ensured.

What is claimed is:

1. A blade for a turbomachine comprising:
   an interior space surrounded by a wall structure forming a surface of the blade; and
   openings in the wall structure, the openings comprising a plurality of micro-channels each individually extending from the interior space to the surface;
   wherein each of the plurality of micro-channels forms a path defining a particular direction for flowing cooling gas; and
   the plurality of micro-channels is distributed over an area region of the surface;

wherein the plurality of micro-channels is, in relation to a normal n to the surface, oriented with at least one of varying angles of inclination $\varphi$, measured in the blade cross section or varying angles of inclination $\vartheta$, measured in the longitudinal orientation of the blade;

wherein the wall structure has a varying wall thickness, wherein the wall thickness is thinner as the impingement angle $\beta$ of a flow in the turbomachine onto the surface of the blade increases.

2. The blade as claimed in claim 1, wherein the micro-channels have a smaller angle $\varphi$ as an impingement angle $\beta$ of a flow in the turbomachine onto the surface of the blade increases.

3. The blade as claimed in claim 1, further comprising a varying spacing from one opening to adjacent openings over the area region.

4. The blade as claimed in claim 3, wherein the spacing a is smaller as an impingement angle $\beta$ of a flow in the turbomachine onto the surface of the blade increases.

5. The blade as claimed in claim 1, further comprising a support structure in the interior space of the blade;
 wherein the support structure is mechanically connected to the wall structure;
 wherein the support structure defines a channel system through which the micro-channels adjoining the support structure are accessible; and
 wherein the channel system has a lower flow resistance than the micro-channels adjoining the support structure.

6. The blade as claimed in claim 5, wherein the support structure comprises a three-dimensional lattice.

7. The blade as claimed in claim 5, wherein the support structure comprises, in its interior, a supply channel for cooling gas; and
 wherein the supply channel has a lower flow resistance than the support structure.

8. The blade as claimed in claim 7, wherein the supply channel is separated from the support structure by a screen.

9. The blade as claimed in claim 8, wherein screen openings in the screen have a cross section no larger than that of the micro-channels.

10. The blade as claimed in claim 8, wherein a total cross section of the screen openings is no smaller than a total cross section of the micro-channels.

11. The blade as claimed in claim 7, wherein the supply channel has an undulating or meandering contour viewed in cross section.

12. The blade as claimed in claim 7, wherein a cross section of the supply channel increases in a radially outward direction proceeding from a blade root.

13. The blade as claimed in claim 7, further comprising strut arrangements in the supply channel.

14. The blade as claimed in claim 7, further comprising a cyclone separator for the cooling gas integrated into the supply channel.

15. The blade as claimed in claim 5, wherein transitions from the support structure into the wall structure are of flowing form.

16. The blade as claimed in one of claim 1, further comprising a supply channel connected to an outlet opening leading to the surface of the blade.

17. The blade as claimed in claim 16, wherein the outlet opening in the surface of the blade is situated on a suction side of the blade or in a trailing edge of the blade.

* * * * *